United States Patent [19]
Macken

[11] 4,219,254
[45] Aug. 26, 1980

[54] CORRECTIVE OPTICS FOR HIGHER ORDER MODE LASERS

[76] Inventor: John A. Macken, 4039 Shadow Hill Dr., Santa Rosa, Calif. 95404

[21] Appl. No.: 933,109

[22] Filed: Aug. 11, 1978

[51] Int. Cl.² .............................................. G02B 5/10
[52] U.S. Cl. .................................... 350/293; 350/288; 331/94.5 C; 331/94.5 T
[58] Field of Search ...................... 350/288, 293, 296; 331/94.5 C, 94.5 D, 94.5 T

[56] References Cited

U.S. PATENT DOCUMENTS

| 3,362,285 | 1/1968 | Hora | 331/94.5 T |
| 4,084,883 | 4/1978 | Eastman et al. | 331/94.5 T |

*Primary Examiner*—F. L. Evans
*Attorney, Agent, or Firm*—Edward E. Roberts

[57] ABSTRACT

This invention provides a device for compensating for the phase distortion in higher order laser modes so that these modes can be focused to diffraction-limited spot sizes. Also, there is provided the means for forcing a laser to oscillate in a particular high-order laser mode.

15 Claims, 8 Drawing Figures

CORRECTIVE OPTICS FOR HIGHER ORDER MODE LASERS

BACKGROUND

1. Field of the Invention.

This invention is directed to laser devices, in general, and to optical devices for improving the operations of such laser devices, in particular.

2. Prior Art.

It is well known to those skilled in the laser field that more output power can be gained from a laser if it oscillates in a high-order mode rather than being forced to oscillate in the TEM$_{00}$ mode. Generally, the higher order laser modes cannot be focused to diffraction-limited spot sizes because the high-order laser mode does not have a uniform phase. However, many applications require that the laser beam must be focused to the smallest possible spot size. Therefore, the TEM$_{00}$ mode is used for these applications even though there is a net loss in power. A discussion of laser modes can be found in any standard text on lasers. For example, reference is made to Lengyel, Bela A; "Introduction to Laser Physics", John Wiley and Sons, Ind., New York, among others.

SUMMARY OF THE INVENTION

There is provided an optical device (mirror) which is used with higher order mode lasers. A transparent substrate has a coating, generally transparent, arranged thereon in a prescribed pattern. The coating can be flat or curved; it can cover portions of the substrate as a layer or as an etched area; also, it can be reflective. The coating has the effect of altering a higher order mode laser so that the higher power operation thereof can be controlled to the same degree as a lower order mode laser.

DESCRIPTION OF PREFERRED EMBODIMENTS

Figure 1:
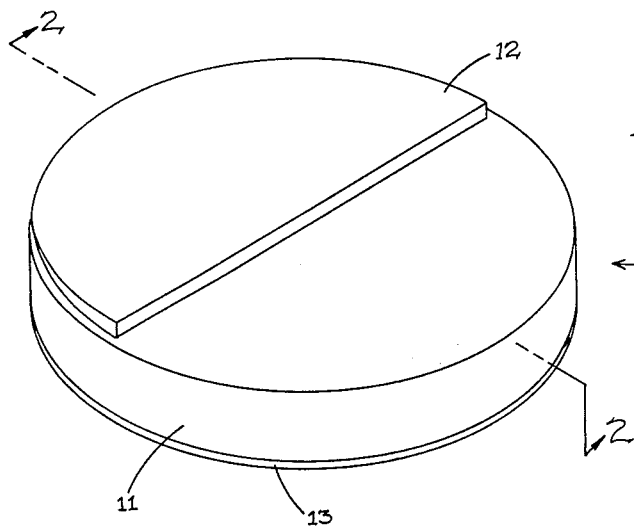
FIG. 1 is a perspective view of one embodiment of a laser output mirror in accordance with this invention.
Figure 2:
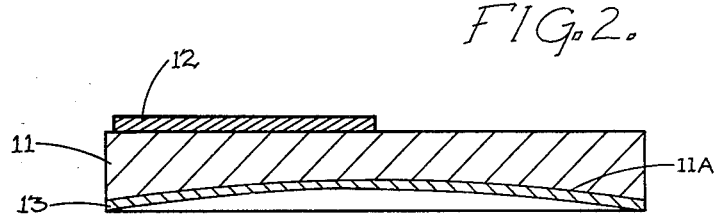
FIG. 2 is a cross-sectional view, horizontal elevation, taken along the lines 2—2 of the embodiment shown in FIG. 1.

FIGS. 1 and 2 depict one embodiment of a laser output mirror, in accordance with the instant invention, which contains the compensating optics necessary to produce a uniform phase across a TEM$_{10}$ laser mode. FIG. 1 is a perspective view of the mirror. FIG. 2 is a cross-section view of the reflector shown in FIG. 1. The mirror 10 shown in FIGS. 1 and 2 includes transparent substrate 11 as part of the laser output coupler. Typically, substrate 11 can be formed of optical quality glass or other material transparent to the laser wavelength. Surface 11A (not to scale) supports a partially transparent, partially reflecting coating 13 which serves as one mirror for the laser. Persons skilled in the art are familiar with the use of dielectric coatings, including multi-layer coatings, to obtain the optimum reflectivity. Coating 13 can be provided in any suitable manner such as vapor deposition or the like. Surface 11A and/or coating 13 can either be flat or curved as desired for the specific application. Vapor deposited coating 12 is disposed on the opposite surface of the output coupler from coating 13. Coating 12 (not to scale) has a thickness designed to introduce a ½ wavelength retardation to the portion of the laser beam which passes through the coated area of the output coupler relative to the portion of the beam which passes through the uncoated area. Typically, coating 12 is formed of a transparent material similar to the material of substrate 11. The mechanical thickness necessary for coating 12 can be calculated from the following formula:

$$T = \frac{\lambda}{2(n-1)}$$

Where T=coating thickness; λ=laser wavelength; and n=index of refraction of the coating material.

Figure 3:
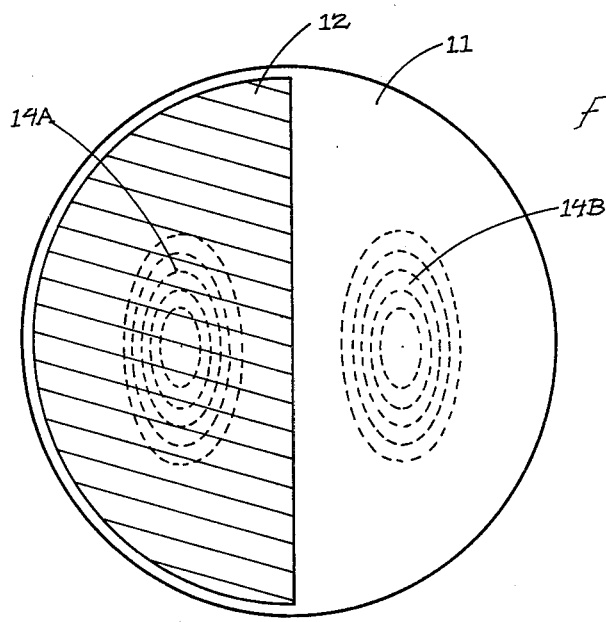
FIG. 3 is a top view of the embodiment shown in FIG. 1 showing the position of laser mode.

FIG. 3 shows the position of retardation coating 12 relative to lobes represented by dashed lines 14A and 14B of the TEM$_{10}$ laser mode. Those skilled in the art will recognize that outlines 14A and 14B are representations of the distribution of uniform intensity zones for a typical TEM$_{10}$ laser mode pattern. From this Figure it can be seen that one of the laser beam lobes, i.e. lobe 14A, passes through retardation coating 12 while the other, i.e. lobe 14B, does not. Since the two laser lobes 14A and 14B initially differ in phase by 180 degrees, retardation coating 12 is designed to introduce a 180 degree retardation so that the two lobes are now in phase. When the laser mode pattern is viewed in the near field of the laser, retardation coating 12 appears to have no effect on the shape of the laser mode. However, in the far field of two lobes of the TEM$_{10}$ mode will combine into a single spot with a small amount of additional power appearing in diffraction lobes resulting from the initial non-uniform spatial distribution beam. Without retardation coating 12, however, the mode pattern, even in the far field, would have retained the two lobes and had a considerably larger divergence angle than when the beam is passed through the retardation coating.

Those skilled in the art will realize that there are other non-essential additions which are possible such as coating the upper surface shown in FIGS. 1 and 2 (surface 11 and 12) with an anti-reflection coating (not shown). If this were done, it would be desirable to have coating 12 have an index of refraction close to or equal to the substrate 11 index of refraction.

Figure 4:
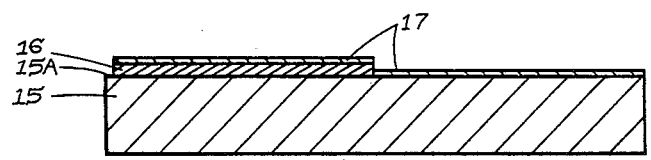
FIG. 4 is a cross-sectional view of another embodiment pattern.

An alternate method of introducing the desired phase shift by using reflective elements rather than transmissive elements in suggested in FIG. 4. In FIG. 4, there is shown a cross-section of a mirror which includes substrate 15 and which can be made of any suitable material such as metal, glass or crystalline material. The polished surface 15A of substrate 15 can either be flat or spherical to an accuracy of ⅛ wavelength of the laser light used or better. Coating 16 is vapor-deposited on the polished surface to a mechanical thickness of ¼ wavelength of the laser light. In this embodiment, coating 16 is semi-circular and appears the same as coating 12 in FIG. 1. Reflecting coating 17 is deposited across the entire mirror including coating 16. This operation produces a mirror which has two surfaces which differ in elevation by a distance equal to ¼ wavelength of the laser light. In this case, the laser beam emerging from a $TEM_{10}$ laser strikes the mirror at near normal incidence so that one lobe falls on the elevated portion (area 16) of the mirror, and the other lobe strikes the non-elevated portion of the reflector.

For purposes of illustration, FIG. 3 can also represent the positioning of the laser beam lobes on the mirror shown in FIG. 4. In this case, area 12 (in FIG. 3) corresponds to the raised area 16 in FIG. 4. The two lobes 14A and 14B of a $TEM_{10}$ laser beam strike the mirror with the orientation shown in FIG. 3. Upon reflection, the quarter wave step produces a half-wave, or 180 degree retardation between the two lobes. It is obvious to those skilled in the art that if substrate 15 and coating 16 are both highly reflective to the laser wavelength, then coating 17 would not be necessary. Also, compensations in the optimum thickness in coating 16 must be made if the incidence angle of the laser beam is considerably off perpendicular.

Figure 5:
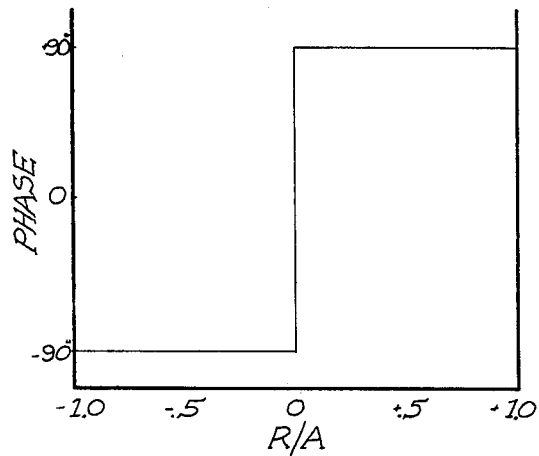
FIGS. 5 and 6 are graphical representations of the phase of emissions from lasers.

FIG. 5 is a graph of the phase emitted from a confocal laser resonator oscillating in the $TEM_{10}$ mode. This graph shows a plot of the phase as a function of the ratio R/A, where R is the distance from the center of the laser tube, and A is the radius of the laser tube. From this graph it can be seen that one half of the laser tube is oscillating 180 degrees out of phase with the other half of the laser tube. The discontinuity of the phase occurs at the center of the laser tube where the amplitude of the light is zero for the $TEM_{10}$ mode.

Figure 6:
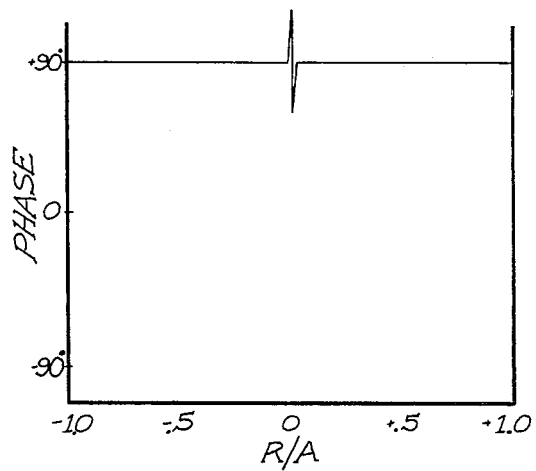

FIG. 6 shows a plot of the phase after the light emitted by a laser in the $TEM_{10}$ mode (see FIG. 5) has been transmitted through the corrective optics described in FIGS. 1, 2 and 3, or reflected off the external mirror shown in FIG. 4. Clearly, the laser beam halves are in phase whereby improved operation is achieved. The small discontinuous region near the center of the graph shows a rapid phase fluctuation and represents the practical variations which might be expected to take place across the discontinuity in the laser phase and the discontinuity in the corrective optics. However, since the intensity of the laser light is zero at this point, this does not present a practical problem.

Figure 7:
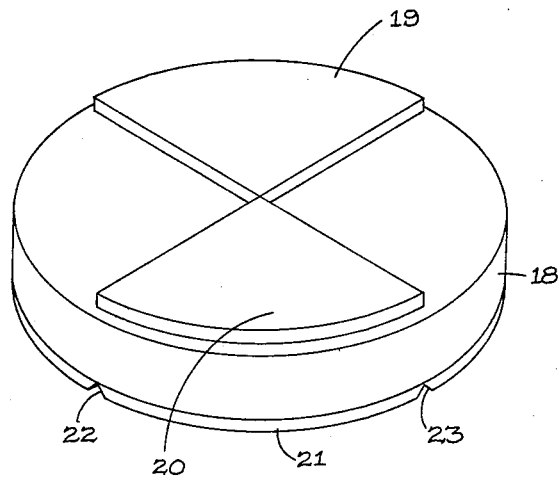
FIGS. 7 and 8 are perspective views of both sides of another embodiment.
Figure 8:
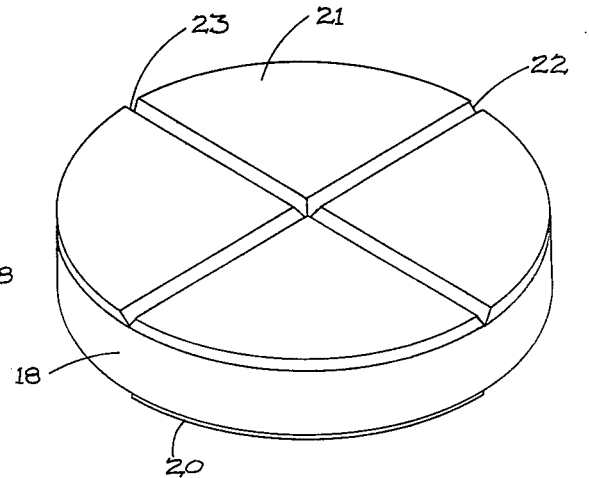

Referring now to FIGS. 7 and 8, there are shown both sides of a semi-transparent reflector which is designed to operate at the $TEM_{11}$ mode from a confocal resonator. FIG. 7 shows the portion of the laser output reflector which, in use, faces away from the laser amplifying material. This reflector has a substrate 18, which is formed of material which is transparent to the laser wavelength. Coatings 19 and 20 (not to scale) are deposited as shown, on the substrate 18. These coatings can both be deposited at the same time. Coatings 19 and 20 produce a ½ wave retardation similar to coating 12 in FIG. 1. The materials and thickness of coatings 19 and 20 follow the same criteria as previously stated for making coating 12.

The reverse side of this semi-transparent reflector is shown in FIG. 8. This surface may either be spherical or flat depending upon the requirements of the laser. On this reverse side, semi-transparent reflective coating 21 (not to scale) is deposited on substrate 18 in suitable fashion. Two lines 22 and 23 in coating 21 are positioned directly behind the edges of coatings 19 and 20 on the obverse side. Lines 22 and 23 can be minute grooves, as shown in FIG. 8, (not to scale). Alternatively, lines 22 and 23 can also be merely a break in coating 21 or any other method known to those skilled in the art for lowering the reflectivity along the lines 22 and 23. The purpose of the lines is to force the laser to oscillate in the $TEM_{11}$ mode, and to align this mode so that the amplitude nulls fall along the lines 22 and 23. Experiments have shown that this will happen automatically when a small decrease in reflectivity is introduced, such as by grooving the reflector as shown in FIG. 8.

The output reflector shown in FIGS. 7 and 8 is oriented on the laser so that the surface carrying coating 21 faces the laser amplifying material. The laser is then forced to oscillate in the $TEM_{11}$ mode with the mode orientation determined by grooves 22 and 23. The output beam passes through the substrate material 18 and the portions of the beam which pass through coatings 19 and 20 receive a ½ wave retardation relative to the portions of the beam which pass through the two uncoated quadrants. This results in an output beam which has uniform phase, and, therefore, can be focused to a diffraction-limited spot considerably smaller than could be obtained without the corrective optics previously described. As previously stated, the use of an anti-reflection coating to cover the upper surface shown in FIG. 7 is optional.

The techniques for applying these stepped, contoured and scribed coatings are within the capabilities of those familiar with vapor deposition. Obviously, the simple 180 degree retardation coatings, such as shown in FIGS. 1 and 7 can be applied merely by masking off the areas which are not to receive any coating and then coating the entire substrate. Contoured coatings can also be made to correct for more complex phase contours. The method of producing contoured coatings is beyond the scope of this patent application.

Thus, there has been shown and described an apparatus such that a high-order laser mode can have the undesirable high beam divergence characteristics removed if the high-order laser mode is passed through or reflected off a corrective optical system which uses vapor deposited coatings to introduce a phase retardation across the laser beam which is the converse of the phase retardation present in the laser beam. Phase graphs for different laser modes are well known. The examples used in this application are for a $TEM_{10}$ mode and a $TEM_{11}$ mode which are the simplest of the higher order laser modes. However, it will be understood by those skilled in the art that this same principle can be applied to all other laser modes including the axi-symmetrical modes.

Having thus described a preferred embodiment of the invention, what is claimed is:

1. A corrective optics system for higher order mode lasers, comprising,
   substrate means,
   at least first coating means disposed on at least a first portion of a first surface of said substrate means,
   said first coating means has a thickness which introduces a fraction of a wavelength retardation to a first phase portion of a laser beam impacting thereon whereby said first phase portion is reflected inphase with a second phase portion of said laser beam not impacting said thickness by the composite including said substrate means and said first coating means.

2. The corrective optics system recited in claim 1 wherein, said substrate means and said first coating means are reflective of said laser beam.

3. The corrective optics system recited in claim 1 including,
second coating means disposed over substantially all of a second surface of said substrate means, and wherein said substrate means is formed of a material transparent to laser wavelengths whereby said second surface serves as a laser mirror.

4. The corrective optics system recited in claim 3 wherein,
said second coating means is formed of a material which is partially transparent and partially reflective of said laser wavelengths.

5. The corrective optics system recited in claim 3 wherein,
said first coating is formed of material which has the same transparency as said substrate material.

6. The corrective optics system recited in claim 3, wherein,
said first coating covers approximately one-half of said first surface of said substrate means, and
said second coating covers substantially all of said second surface of said substrate means.

7. The corrective optics system recited in claim 1, wherein,
said first coating means has a thickness $T = \lambda/2(n-1)$, where $\lambda$ = laser wavelength and n = index of refraction of coating material.

8. The corrective optics system recited in claim 1, wherein,
said fraction is $\frac{1}{2}$.

9. The corrective optics system recited in claim 3, wherein,
at least one of said surfaces of said substrate means is spherical.

10. The corrective optics system recited in claim 1, including,
a second coating disposed on said first surface of said substrate with said second coating overlying said first coating.

11. The corrective optics system recited in claim 3, including,
at least one line in said second coating which exhibits lower reflectivity than said second coating,
each said line aligned with the end of said first coating means.

12. The corrective optics system recited in claim 10, wherein,
said second coating means is highly reflective to said laser wavelengths.

13. The corrective optics system recited in claim 1, wherein,
said substrate means is formed of metal and includes a highly polished reflective surface.

14. The corrective optics system recited in claim 1, wherein,
said first coating means covers approximately one-half the surface of said substrate means and has a thickness equal to $\frac{1}{4}$ of a laser wavelength.

15. The corrective optics system recited in claim 1, wherein,
said first phase portion and said second phase portion are lobes of the $TEM_{10}$ laser mode and differ in phase by approximately 180 degrees.

* * * * *